US007426329B2

(12) United States Patent
Calhoon et al.

(10) Patent No.: US 7,426,329 B2
(45) Date of Patent: Sep. 16, 2008

(54) SYSTEMS AND METHODS FOR RECEIVING, STORING, AND RENDERING DIGITAL VIDEO, MUSIC, AND PICTURES ON A PERSONAL MEDIA PLAYER

(75) Inventors: John C. Calhoon, Woodinville, WA (US); Scott J. Fierstein, Sammamish, WA (US); Scott Manchester, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 932 days.

(21) Appl. No.: 10/384,923

(22) Filed: Mar. 6, 2003

(65) Prior Publication Data

US 2004/0175098 A1 Sep. 9, 2004

(51) Int. Cl.
*H04N 5/76* (2006.01)
*H04N 7/00* (2006.01)
*H04N 5/00* (2006.01)

(52) U.S. Cl. ......................... 386/46; 386/125
(58) Field of Classification Search ................ 386/1, 386/45–46, 33, 96, 125–126; 348/552
See application file for complete search history.

(56) References Cited

U.S. PATENT DOCUMENTS 6,374,040 B2   4/2002   Mizoguchi et al. .......... 386/125
6,487,663 B1   11/2002  Jaisimha et al. ............. 713/193
6,897,368 B2 * 5/2005   Georges ...................... 84/609
7,046,230 B2 * 5/2006   Zadesky et al. ............. 345/156
7,103,574 B1 * 9/2006   Peinado et al. ................ 705/51
7,299,304 B2 * 11/2007  Saint-Hilaire et al. ......... 710/11

OTHER PUBLICATIONS

Fout, T., "Universal Plug and Play in Windows® XP," Microsoft Windows XP Operating System, Jul. 2001, 1-32.

* cited by examiner

*Primary Examiner*—Thai Tran
*Assistant Examiner*—Nigar Chowdhury
(74) *Attorney, Agent, or Firm*—Woodcock Washburn LLP

(57) ABSTRACT

A personal media player (PMP) uses a digital media processing system—comprising a video rendering subsystem, a music rendering subsystem, and a picture rendering subsystem—to produce moving-video (video), audio (music), still-graphics (picture), and other output rendered from media files ported to the PMP from another source. The PMP further comprises a user interface system, a display unit system, a power source system, and a data port system utilizing Universal Plug and Play functionality, all of which are coupled directly or indirectly to the digital media processing system. The physical components constituting the aforementioned systems and subsystems are then encased in a portable housing unit suitable for hand-held use and ready portability.

25 Claims, 5 Drawing Sheets

SYSTEMS AND METHODS FOR RECEIVING, STORING, AND RENDERING DIGITAL VIDEO, MUSIC, AND PICTURES ON A PERSONAL MEDIA PLAYER

TECHNICAL FIELD

The invention relates generally to personal digital media players and, more specifically, to systems and methods for receiving, storing, and rendering digital video, audio, and still images on a portable playback device.

BACKGROUND OF THE INVENTION

There are a variety of digital video formats, including MPEG, AVI, QuickTime, and Windows Media, among others. The MPEG standards, for example, are an evolving set of standards for video and audio compression and for multimedia delivery developed by the Moving Picture Experts Group (MPEG). MPEG-1 was designed for coding progressive video at a transmission rate of about 1.5 million bits per second, and MPEG-1 audio layer-3 (MP3) has also evolved from this early MPEG work. The current predominant standard, MPEG-2, was designed for coding interlaced images at transmission rates above 4 million bits per second and is used for digital TV broadcast and DVD. The newer MPEG-4 is a much more ambitious standard and addresses speech and video synthesis, fractal geometry, computer visualization, and an artificial intelligence (AI) approach to reconstructing images. MPEG-4 addresses a standard way for authors to create and define the media objects in a multimedia presentation, how these can be synchronized and related to each other in transmission, and how users are to be able to interact with the media objects. Finally, MPEG-21, which is still under development, provides a larger, architectural framework for the creation and delivery of multimedia. Due to their widespread use and versatility, the MPEG standards have been adopted for a variety of consumer formats including Digital Versatile Disc (DVD), computer media files, and web-based streaming media, and Personal Video Recorder (PVR).

A PVR is an interactive TV recording device that is sometimes referred to as a digital video recorder (DVR), a personal TV receiver (PTR), a personal video station (PVS), or a hard disk recorder (HDR). Like the familiar video cassette recorder (VCR), a PVR records and plays back television programs, but, unlike the VCR, it stores the programs in digital (rather than analog) form. The PVR encodes an incoming video data stream as MPEG-1 or MPEG-2 and stores it on a computer-readable medium, generally a hard disk drive.

To view video files, a user needs a computer system or other electronic system with sufficient processor speed to render the video images adequately, internal memory to support the rendering, physical media storage space (such as a hard drive) to store the sometimes large MPEG files, and appropriate software to render the raw MPEG file into image data that can be displayed to the user. Ideally, such a system would also be small and portable in order to accommodate the mobility needs of its user.

While portable (e.g., hand-held) products are available to render digital video, music, and picture files for consumers, there is lacking in the art an easy-to-use personal media player that can be readily loaded with a variety of media files.

SUMMARY OF INVENTION

A personal media player (PMP) uses a digital media processing system—comprising a video rendering subsystem, a music rendering subsystem, and a picture rendering subsystem—to produce moving-video (video), audio (music), still-graphics (picture), and other output rendered from media files ported to the PMP from another source. The PMP further comprises a user interface system, a display unit system, a power source system, and a data port system utilizing Universal Plug and Play functionality, all of which are coupled directly or indirectly to the digital media processing system. The physical components constituting the aforementioned systems and subsystems are then encased in a portable housing unit suitable for hand-held use and ready portability.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF THE INVENTION

Overview

The following discussion is directed to a system comprising a portable device that receives, stores, and renders digital video. The subject matter is described with specificity to meet statutory requirements. However, the description itself is not intended to limit the scope of this patent. Rather, the inventors have contemplated that the claimed subject matter might also be embodied in other ways, to include different elements or combinations of elements similar to the ones described in this document, in conjunction with other present or future technologies.

Functional Components

Figure 1:
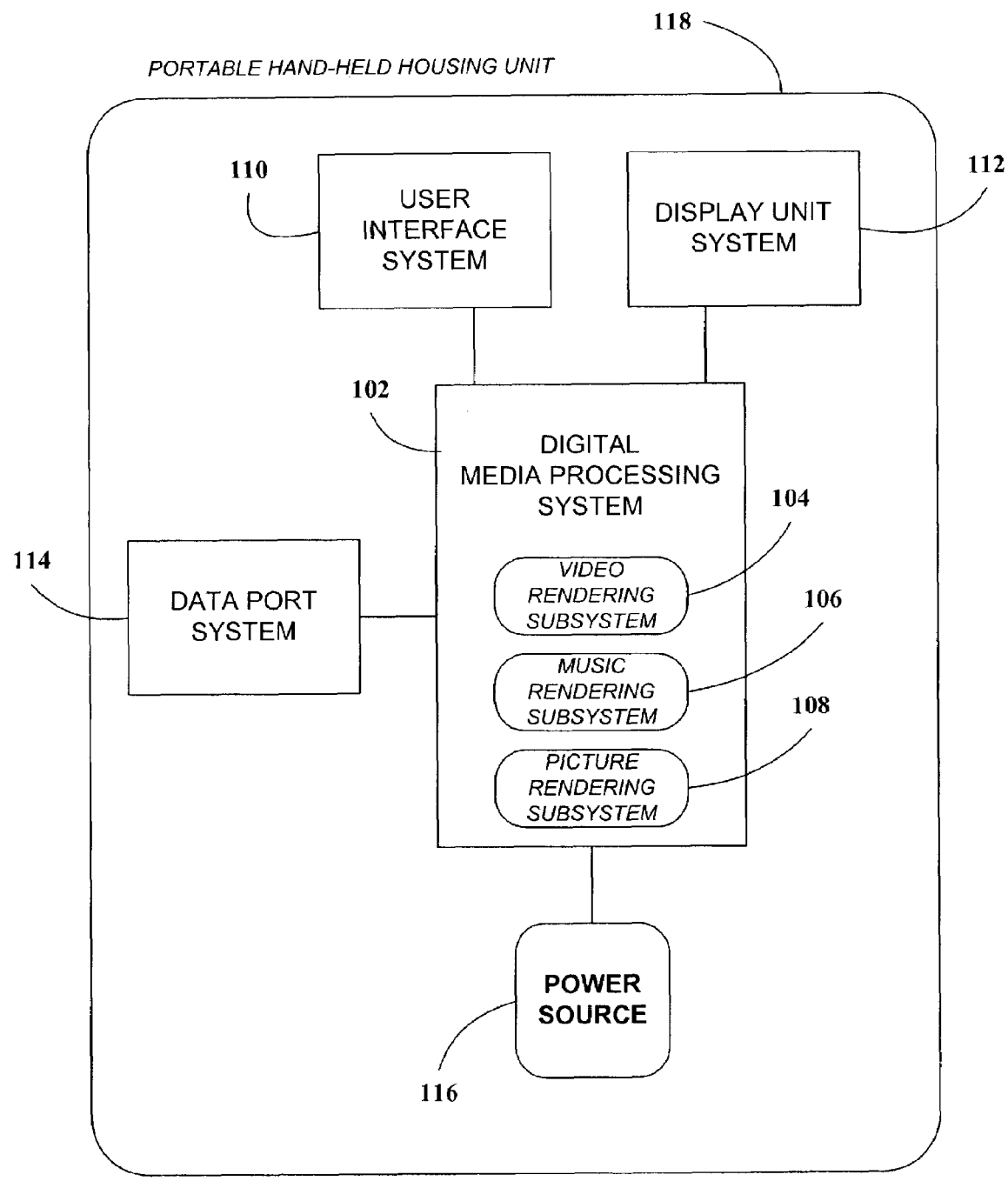
FIG. 1 is a block diagram illustrating functional components of one embodiment of a personal media player.

FIG. 1 is a block diagram illustrating functional components of one embodiment of a personal media player 100. In this embodiment, the functional components comprising the personal media player 100 include a digital media processing system 102, a user interface system 110, a display unit system 112, a power source system 114, and a data port system 116. The digital media processing system 102 further comprises a video rendering 104, a music rendering subsystem 106, and a picture rendering subsystem 108.

The digital media processing system 102 is the central processing system for the personal media player 100 and is akin to similar or equivalent processing systems found in a variety of electronic devices such as personal computers (PCs), portable wireless handsets, palmtops, personal digital assistants (PDAs), pocket personal computers (PPCs), portable gaming systems, digital recording and playback systems, and other electronic devices.

Some of the primary functions of the digital media processing system 102 may include receiving media files downloaded to the unit, coordinating storage of such media files, recalling specific media files on demand, and rendering media files into audio/visual output for the user of the personal media player 100. Additional functions of the digital media processing system 102 may also include searching external resources for media files, coordinating Digital Rights Management protocols for protected media files, and interfacing directly with other recording and playback systems.

The digital media processing system 102 further comprises three subsystems: the video rendering subsystem 104 which handles all functionality related to video-based media files (includes files in MPEG and other formats); the music rendering subsystem 106 which handles all functionality related to audio-based media files including music (including files using MP3—that is, MPEG-1 Audio Layer-3—and other formats); and the picture rendering subsystem 108 which handles all functionality related to picture-based media files (including JPEG, GIF, and other picture formats). Although these subsystems are logically distinguished herein, each may in fact share hardware and software components with each other and with the rest of the personal media player 100.

Functionally coupled to the digital media processing system 102 is a user interface system 110 whereby the user of the personal media player 100 can, to a certain degree, control the operation of the device. A display unit system 112 is also functionally coupled to the digital media processing system and may comprise a video display and an audio output for playback of rendered video, music, and pictures media files. The display unit system 112 may also functionally support and compliment the operation of the user interface system 110 by providing visual and audio output to the user during operation.

The data port system 114 is also functionally coupled to the digital media processing system 102 and provides a means by which the personal media player 100 can interface with external electronic systems in order to download media content therefrom. In certain embodiments, the data port system 114 may comprise a Universal Serial Bus port, a network connection, or some other means of connectivity.

The personal media player 100 has a power source system 116 that provides power to the entire device. The power source system in this embodiment is coupled directly to the digital media processing system 102 and indirectly to the other systems and subsystems through the digital media processing system 102. The power source system 116 may also be directly coupled to any other system or subsystem of the personal media player 100—alternative configurations are well-known and understand by those skilled in the art—and thus any reference herein this specification or in the claims that the power source system 116 is coupled to the digital media processing system 102 should be interpreted to mean that the power source system 102 is directly or indirectly providing power to every system and subsystem of the personal media player 100 that requires electric power for operation. In the present embodiment, the power source may be a battery, a power converter/transformer, a solar converter, or any other type of electric-providing power source, portable or otherwise.

The foregoing functional elements and their corresponding physical components are fixed or enclosed by the portable housing unit 118. This portable handheld housing unit, which both protects the electronic components of the personal media player 100 as well as provides a medium in which the physical components can be fixed, may be limited in size to a total unit volume (length by width by height) of no more than fifty cubic inches in order to enable true "hand-held portability."

Physical Components

Figure 2:
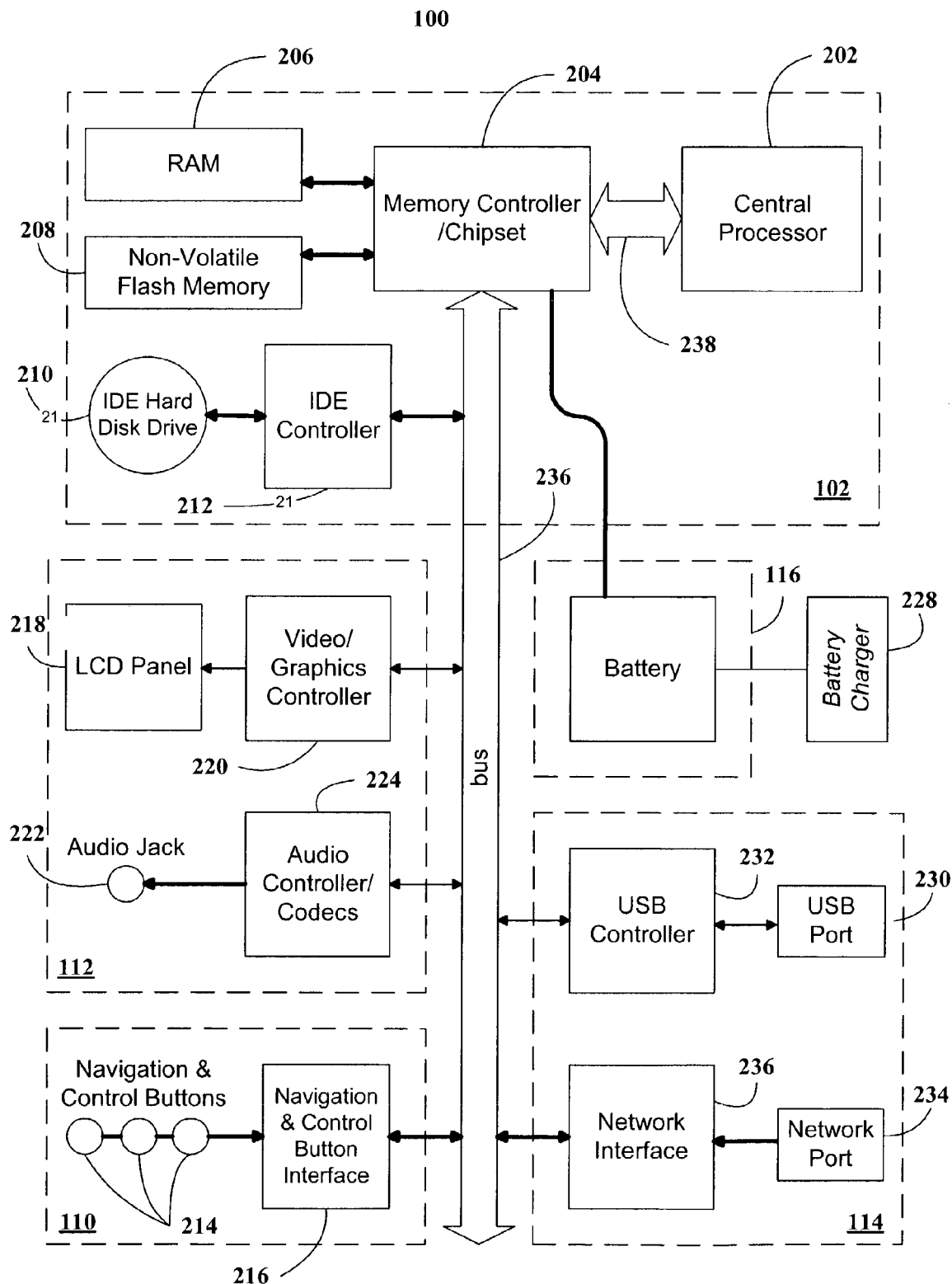
FIG. 2 is a block diagram illustrating physical components of one embodiment of a personal media player.

FIG. 2 is a block diagram illustrating physical components of one embodiment of a personal media player 100 based on the functional components described in FIG. 1 (and denoted herein this figure by broken-line boxes), including the digital media processing system 102, the user interface system 110, the display unit system 112, the data port system 114, and the power source system 116. However, even though each physical component is shown as included in only a single functional component in the present figure, physical components may in fact be shared by more than one functional component, as understood and appreciated by those skilled in the art, and thus any reference herein this specification or in the claims to a specific physical component should not be interpreted as limiting the use of that component to the functional group in which FIG. 2 indicates it may belong.

As FIG. 2 demonstrates, one physical embodiment of the personal media player may comprise a central processor 202 coupled to a memory controller/chipset 204 by, for example, a multi-pin connection 238. The memory controller/chipset 204, in turn, may be coupled to random access memory (RAM) 206 and/or non-volatile flash memory 208. These components, through connectivity with the memory controller/chipset, may also be collectively coupled to an IDE hard disk drive 210 via an IDE controller 212, as well as to the rest of the functional component systems, via a system bus 236 that couples various system components to each other.

While the present embodiment specifies the use of RAM and/or non-volatile flash memory, various alternative embodiments are also possible. In general, the system memory may include computer storage media in the form of volatile and/or nonvolatile memory such as read only memory (ROM) and random access memory (RAM) 132. Moreover, a basic input/output system (e.g., BIOS) containing the basic routines that help to transfer information between elements within the system such as during start-up, may be stored in ROM. RAM, on the other hand, typically contains data and/or program modules that are immediately accessible to and/or presently being operated on by a processing unit.

Although the present embodiment specifies the use of an IDE hard disk drive 210, other computer-readable media may be substituted from among the variety of computer readable media available. In this regard, computer readable media can be any available media that can be accessed by a computer system and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

In addition, the system bus 236 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Together the aforementioned components constitute the digital media processing system 102, and each of these physical components also constitute the physical components of each of the three subsystems, the video rendering subsystem 104, the music rendering subsystem 106, the picture rendering subsystem 108, and, in an alternative embodiment, a Digital Rights Management subsystem (not shown).

Regarding the power supply system 116, a battery 226 may be used to provide power to the entire system via connectivity directly to the memory controller/chipset 204 (as shown), or by multiple connections to various physical components. The battery 226, in turn, may also be connected to a battery charger 228 which may be separate from the power supply system 116 and the personal media player 100 (as shown) or, alternately, which may be incorporated into the personal media player 100 and the power supply system.

An LCD panel 218 and its associated video/graphics controller 220, as well as an audio jack 222 and its associated audio controller/codec, may comprise the display unit system and may be directly or indirectly connected to the other physical components via the system bus 236. Likewise, navigation and control buttons 214 and the navigation and control button interface 216 may comprise the user interface system 110, and a Universal Serial Bus port 230 and a network port 234, along with a USB controller 232 and a network interface 236 respectively, may constitute the physical components of the data port system. These components also directly or indirectly connect to the other components via the system bus 236.

External Layout

Figure 3A:
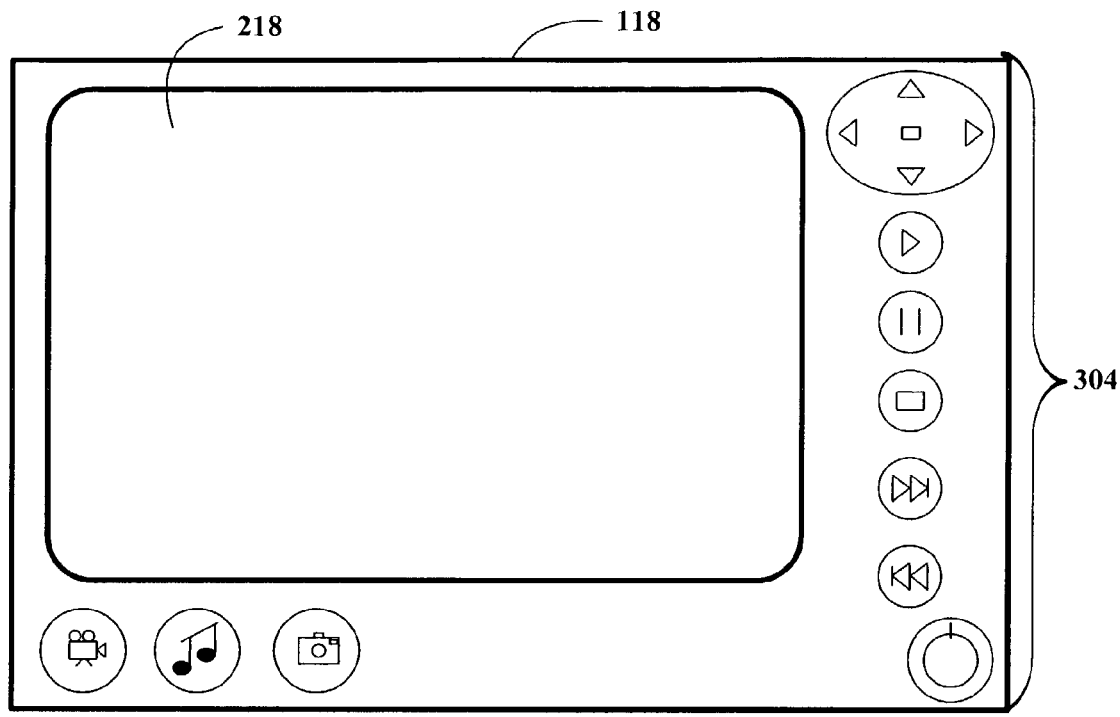
FIGS. 3A and 3B illustrate the external appearance from a top-view perspective of one embodiment of the personal media player.
Figure 3B:
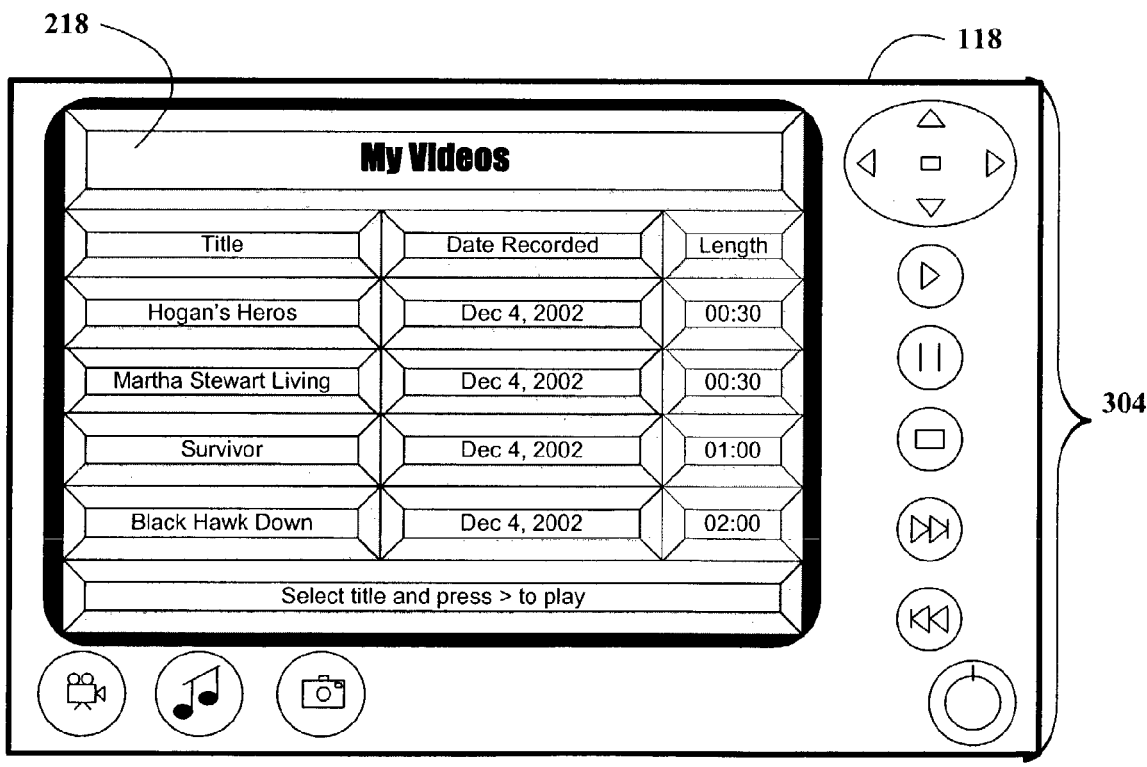

FIGS. 3A and 3B illustrate the external appearance from a top-view perspective of one embodiment of the personal media player 100. (FIG. 3A illustrates the unit rendering a video media file while FIG. 3B illustrates the unit displaying a video file selection screen.) The portable housing unit 118 houses an LCD panel 218 on which video and picture images are displayed upon rendering. A left-side media select group 302 may enable the user of the personal media player 100 to select the media type for rendering, and the right-side media select group 304 may enable the user to select the specific media file to render and output, including standard controls for video and sound, a five-direction navigation button to browse media selections that may be displayed on the LCD panel 218, and/or volume control, among others. (The left-side media select group 302 and the right-side media select group 304 together comprise the navigation and control buttons 214 of FIG. 2.)

Accessing External Media Content Sources

Figure 4A:
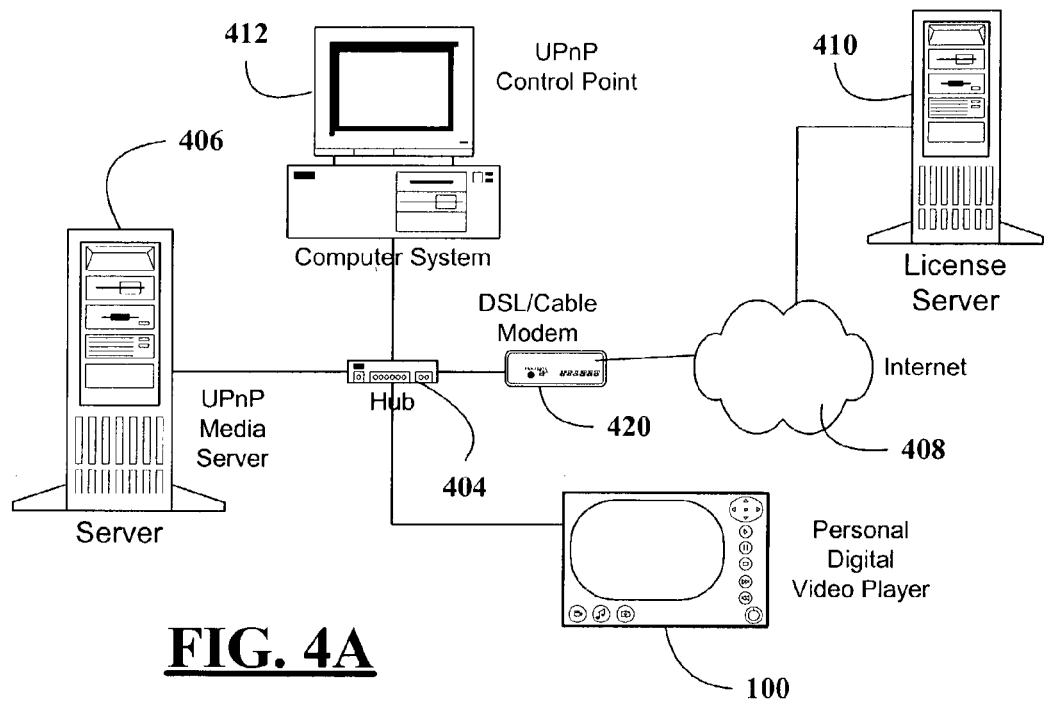
FIGS. 4A and 4B illustrate two embodiments of the personal digital player while connected to external media content sources.
Figure 4B:
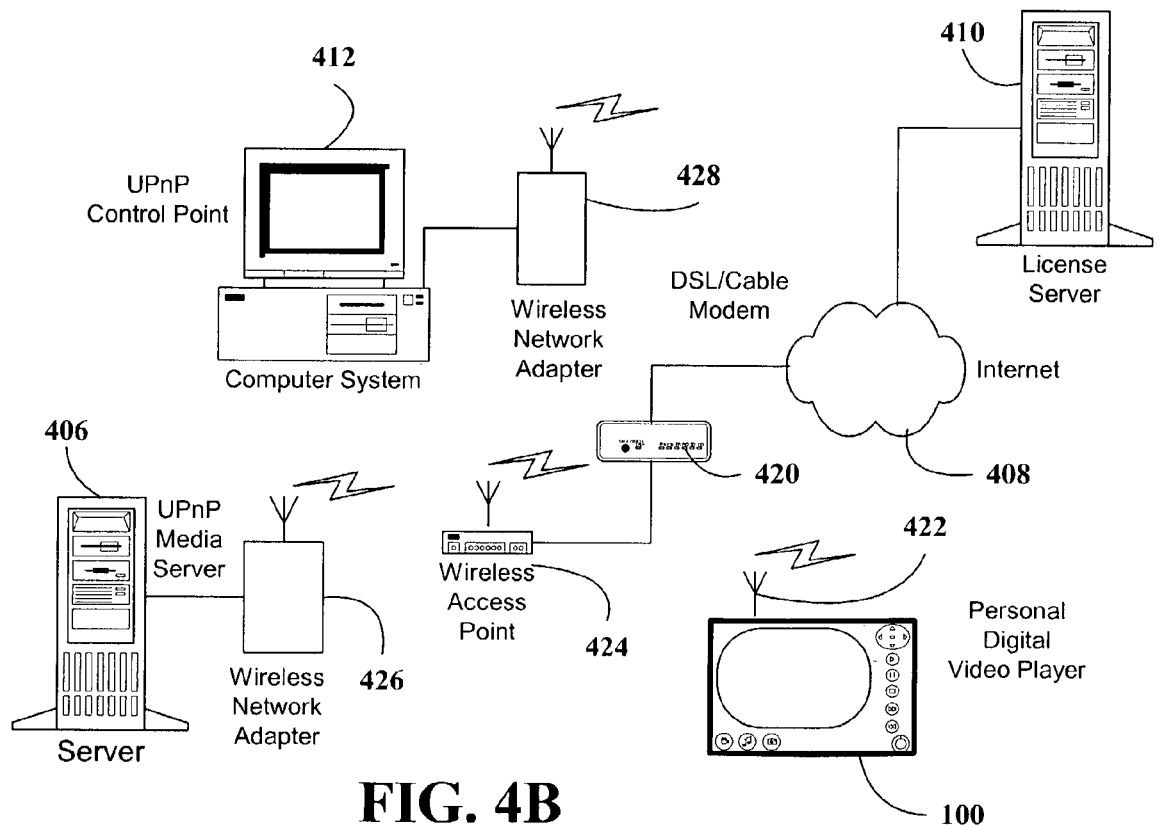

FIGS. 4A and 4B illustrate two embodiments of the personal digital player 100 while connected to external media content sources. In each embodiment, the personal digital player 100, utilizing Universal Plug and Play (UPnP) functionality, is connected to network hub 404 or a wireless access point 424 either by a physical connection as shown in FIG. 4A or by a wireless connection with wireless network adapters 422, 426, and 428 as shown in FIG. 4B. In these examples, the hub 404 or wireless access point 424 is also connected, either physically or wirelessly, to a UPnP media server 406, a UPnP control point 412, and a DSL/Cable modem 420 which, in turn, is connected to a license server 410 via a distributed network medium such as the Internet 408.

Plug and Play (PnP) is a capability developed by Microsoft for its Windows 95 and later operating systems that gives users the ability to plug a device, such as a personal music player, directly into a personal computer or other computer system and have that computer recognize that the device is there and, thereafter, coordinate interaction between the computer and the device.

Universal Plug and Play (UPnP) has emerged as a parallel to PnP for network connected devices that uses Internet and Web protocols to enable devices such as PCs, peripherals, intelligent appliances, and wireless devices to be plugged into a network and automatically detect and coordinate interaction with each other. With UPnP, when a user plugs a device into a network, the device will configure itself to the network, acquire a TCP/IP address from the network, and use a discovery protocol based on the Internet's Hypertext Transfer Protocol (HTTP) to announce its presence on the network to other devices. For instance, if a user had a camera and a printer connected to the network and needed to print out a photograph, the user could press a button on the camera and have the camera send a "discover" request asking if there were any printers on the network. The printer, in turn, would identify itself and send its location in the form of a universal resource locator (URL). Thereafter the camera and printer would use Extensible Markup Language (XML) to establish a common language, or "protocol negotiation," to talk to each other and determine the capabilities of the other device. Once a common language was established, the camera, for example, would control the printer and print the photograph the user selected.

Porting Media Content

Figure 5:
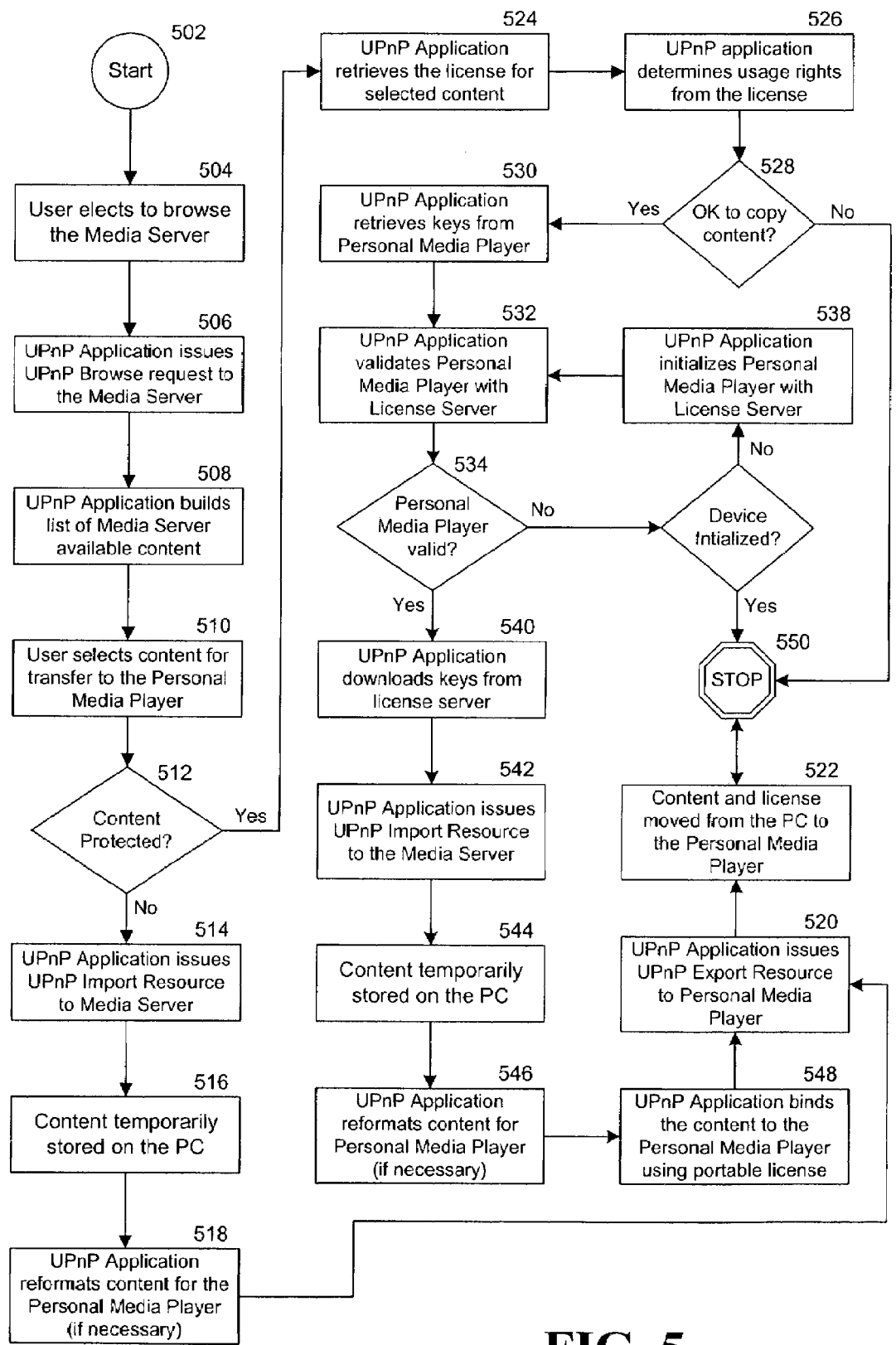
FIG. 5 is a flow chart depicting one embodiment of the operation for porting digital media content to the personal media player using Universal Plug and Play (UPnP) functionality, a personal computer operating as a UPnP control point, and Digital Rights Management technology.

FIG. 5 is a flow chart depicting one embodiment of the operation for porting digital media content to the personal media player 100 using Universal Plug and Play functionality, a personal computer operating as a UPnP control point 412, and Digital Rights Management technology. At block 502 the user connects the personal media player 100 to a network (via a hub 404 or wireless access point 424 as shown in FIGS. 4A and 4B respectively) and utilizing its UPnP functionality to start the process and identify the resources on the network (in this case, the UPnP media server 406) as described in FIG. 5. At block 504 the user, in this case using the UPnP control point (also referred to herein this figure as the "personal computer" or "PC" to reflect one possible embodiment), browses the UPnP media server and, at block 506, the UPnP application (running on the UPnP control point) issues a UPnP browse request to the UPnP media server 406. Based on information returned by the UPnP media server 406 to this request, at block 508 the UPnP application builds a list of digital media content available on the UPnP media server 406 and, at block 510, the user selects the media files to be transferred to the personal media player 100. At block 512 the UPnP application determines if the content is protected and, if not, at block 514 the UPnP application issues a UPnP import resource command to the UPnP media server 406. Upon receipt of the content at block 516, the media files are temporarily stored on the UPnP control point 412 so that, at block 518, the UPnP application can reformat the media files based on the personal media player's 100 rendering and playback capabilities. After reformat is complete, at block 520 the UPnP application issues a UPnP export resource command to export the media files to the personal media player 100 and, at block 522, the media files are moved from the UPnP control point 412 to the personal media player 100, which ends the process at block 550 and the personal media player 100 can be disconnected from the network (the hub 404 or wireless access point 424).

Returning to block 512, if the UPnP application determines that the content is indeed protected—such as protections afforded by Digital Rights Management technologies as known and well-understood by those of skill in the art (and described in additional detail herein below)—at block 524 the UPnP application retrieves the license for the selected content from the media server, at block 526 the UPnP application parses the license for usage rights established for the selected protected content. Based on these rights, the UPnP application can now ascertain if it is permissible to copy the selected content based on and, if not, the download process is immediately ended at block 550. On the other hand, if it is permissible to copy the selected content, at block 530 the UPnP application retrieves keys from the personal media player 100 and, at block 532, the UPnP application uses these keys to validate the personal media player 100 with the license server 410. If the personal media player 100 is not validated at block 534, and if the personal media player 100 has not been initialized at block 536, at block 538 the UPnP application initializes the personal media player 100 with the license server 410 and returns to block 534. On the other hand, if the personal media player 100 is not validated at block 534 and if the personal media player 100 has already been initialized at block 536, the process immediately terminates at block 550.

After the personal media player 100 is validated, at block 540 the UPnP application downloads new keys pertaining to the selected content from the license server 410 for the purpose of creating a portable license. At block 542 the UPnP application then issues a UPnP import resource command to the UPnP media server 406. Upon receipt of the content, at block 544 the media files are temporarily stored on the UPnP control point 412 so that, at block 546, the UPnP application can reformat the media files based on the personal media player's 100 rendering and playback capabilities. Furthermore, at block 548 the UPnP application also binds the content to the personal media player 100 using the portable license data provided by the UPnP media server 410, as such binding techniques are known and understood by those of skill in the art. After reformat and binding is complete, at block 520 the UPnP application issues a UPnP export resource command to export the media files to the personal media player 100 and, at block 522, the media files and portable licenses are moved from the UPnP control point 412 to the personal media player 100 which, in turn, ends the process at block 550 and the personal media player 100 can be disconnected from the network (the hub 404 or wireless access point 424).

In regard to the embodiment described above, Digital Rights Management (DRM) is a type of server software developed to enable secure distribution and prevent illegal distribution of paid content over the Web. Various DRM technologies have been developed as a means of protection against the online piracy of commercially marketed material which has proliferated through the widespread use of peer-to-peer file exchange programs. Although online content is protected by copyright laws, policing the Web and catching law-breakers is very difficult. DRM technology focuses on making it impossible to steal Web content in the first place, a much surer approach to the problem than the hit-and-miss strategies aimed at apprehending online poachers after the fact. A number of companies have released various DRM products based on a variety of approaches and technologies. In general, DRM products are turnkey packages that include everything needed for the operation, such as, for example, server software and user plug-ins.

For example, and not by way of limitation, ContentGuard DRM software uses XrML (Extensible Rights Markup Language) and has four major components: a protection toolkit that allows users to decide on their own access and encryption rules, a distribution toolkit that helps users create interfaces for content distribution, a consumer toolkit that verifies authorization before content is distributed, and a back-office component that tracks usage and licensing. Another example, InterTrust DRM, focuses on the protection of graphic and text content such as JPEG, GIF, and PDF files. And EMediator DRM works through a plug-in that users must download before they receive access to protected material. When the plug-in is downloaded, administrators can set various policies for access to different components of the content, such as print or copy restrictions set on material that may be freely viewed, or may set a time limit on access.

Although the present embodiment describes interactivity in a system where the UPnP control point 412 and the UPnP application are separate and distinct from the personal media player 100, an alternative embodiment of the present invention would be a personal media player 100 possessing some or all of the functionality of the UPnP control point 412 and/or the UPnP application. Another alternative embodiment of the present invention would also enable the personal media player 100 to control one or more of the processes described herein for porting media files to the PMP, as opposed to the entire porting process being entirely controlled by the UPnP control point 412.

CONCLUSION

The various techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention.

While the present invention has been described in connection with the preferred embodiments of the various figures, it is to be understood that other similar embodiments may be used or modifications and additions may be made to the described embodiment for performing the same function of the present invention without deviating there from. For example, while exemplary embodiments of the invention are described in the context of digital devices emulating the functionality of personal computers and PDAs, one skilled in the art will recognize that the present invention is not limited to such digital devices, as described in the present application may apply to any number of existing or emerging computing devices or environments, such as a gaming console, handheld computer, portable computer, etc. whether wired or wireless, and may be applied to any number of such computing devices connected via a communications network, and interacting across the network. Furthermore, it should be emphasized that a variety of computer platforms, including handheld device operating systems and other application specific operating systems, are herein contemplated, especially as the number of wireless networked devices continues to proliferate. Therefore, the present invention should not be limited to any single embodiment, but rather construed in breadth and scope in accordance with the appended claims.

What is claimed is:

1. A personal media player comprising:
    a digital media processing system comprising a video rendering subsystem, a music rendering subsystem, and a picture rendering subsystem;
    a user interface system coupled to the digital media processing system;
    a display unit system coupled to the digital media processing system;
    a power source system coupled to the digital media processing system for providing power to at least one component of the personal media player requiring power for operation;
    a Universal Plug and Play data port connection system coupled to the digital media processing system, the data port connection system capable of configuring itself to a network by acquiring a TCP/IP address from the network and using a hypertext transfer protocol to notify at least one other device connected to the network; and
    a portable housing unit encompassing the digital media processing system, the user interface system, the display unit system, the power source system, and the data port systems,
    wherein if the digital media processing system determines selected media content comprises protected content:
    the Universal Plug and Play data port connection system is adapted to issue a request to retrieve key IDs for the selected media content from a media server communicatively coupled to the personal media player via the network, retrieve rights for the selected media content from the license server, upon determining the retrieved rights indicate the selected media content may be copied retrieving keys from the personal media player and validating the personal media player with the license sever, and downloading a license from the license server.

2. The personal media player of claim 1 wherein the digital media processing system comprises a computer system.

3. The personal media player of claim 1 further comprising a Digital Rights Management subsystem.

4. The personal media player of claim 1 wherein the user interface comprises a left-side media select group and a right-side media control group.

5. The personal media player of claim 1 wherein the display unit comprises a Liquid Crystal Display.

6. The personal media player of claim 1 wherein the power source system comprises a battery.

7. The personal media player of claim 1 wherein the data port system further comprises a Universal Serial Bus connection.

8. The personal media player of claim 1 wherein:
    the digital media processing system comprises a computer system;
    the personal media player further comprises a Digital Rights Management subsystem;
    the user interface comprises a left-side media select group and a right-side media control group;
    the display unit comprises a Liquid Crystal Display; and
    the power source system comprises a battery.

9. A method for porting media on a personal media player comprising:
    establishing communication over a network between a personal media player having a Universal Plug and Play application and a media server using Universal Plug and Play functionality, the Universal Plug and Play functionality including acquiring a TCP/IP address from the network and using a hypertext transfer protocol to notify at least one other device connected to the network;
    at the personal media player issuing a Universal Plug and Play browse request to the media server, the browse request resulting in identification of media content on the media server that is available for downloading to the personal media player;
    at the personal media player, selecting media content on the media server that is available for downloading;
    at the personal media player, determining if the selected media content comprises protected content;
    if the personal media player determines the selected media content comprises protected content:
        at the personal media player, the Universal Plug and Play application issuing a request to retrieve key IDs for the selected media content from the media server;
        at the personal media player, the Universal Plug and Play application retrieving rights for the selected media content from a license server communicatively coupled to the personal media player via the network; and
        upon determining the retrieved rights indicate the selected media content may be copied, at the personal media player, the Universal Plug and Play application retrieving keys from the personal media player and validating the personal media player with the license server; and
        at the personal media player, the Universal Plug and Play application downloading a license from the license server,
    at the personal media player, the Universal Plug and Play application issuing a Universal Plug and Play import request for the selected content to the media server;

at a Universal Plug and Play control point communicatively coupled to the personal media player via the network, receiving and storing the selected media content;

at the personal media player, the Universal Plug and Play application requesting that the Universal Plug and Play control point reformat the selected content for use on the personal media player;

at the personal media player, the Universal Plug and Play application issuing a Universal Plug and Play request to export the reformatted selected content from the Universal Plug and Play control point to the personal media player;

at the personal media player, receiving the selected content from the Universal Plug and Play control point.

10. The method of claim 9, wherein issuing a Universal Plug and Play browse request to the media server comprises issuing the browse request via the Universal Plug and Play control point.

11. The method of claim 9 wherein retrieving rights for the selected media content from a license server comprises retrieving a license from the license server and parsing the license for usage rights established for the selected content.

12. The method of claim 11 further comprising determining if the parsed license indicates the selected media content may be copied.

13. The method of claim 9 wherein validating the personal media player with the license server comprises determining that the personal media player has not been initialized and initializing the personal media player with the license server.

14. The method of claim 9 further comprising at the personal media player, the Universal Plug and Play application binds the selected content to the personal media player using the license.

15. A computer storage medium bearing computer readable instructions for:

establishing a connection between a personal media player and a computer system connected to a network using Universal Plug and Play functionality;

acquiring a TCP/IP address from the network and using a hypertext transfer protocol to notify at least one other device connected to the network;

identifying media files on the computer system that are available for downloading to the personal media player;

determining whether the media files comprise protected content;

the Universal Plug and Play data port upon determining that the media files comprise protected content, retrieving at least one of a key ID and a license for the content from the network in order to determine whether the content may be copied;

the Universal Plug and Play data port upon determining the content may be copied, retrieving keys from the personal media player, validating the personal media player with the network and downloading a license from the network;

selecting media files on the computer system that are available for downloading;

downloading at least one media file to the personal media player from the computer system; and operating the personal media player to render output from at least one of the media files downloaded from the computer system.

16. The computer storage medium of claim 15 further comprising computer readable instructions for discontinuing the connection between the portable media player and the computer system.

17. The computer storage medium of claim 15 further comprising computer readable instructions for establishing a connection to the computer system via a network connection.

18. The computer storage medium of claim 15 further comprising computer readable instructions for establishing a connection to the computer system via a Universal Serial Bus connection.

19. The computer storage medium of claim 15 further comprising computer readable instructions for validating the personal media player to receive at least one media file protected by Digital Rights Management technologies.

20. The computer storage medium of claim 15 further comprising computer readable instructions for receiving a license to at least one media file.

21. The computer storage medium of claim 15 further comprising computer readable instructions for receiving a decryption key to at least one encrypted media file.

22. The computer storage medium of claim 15 further comprising computer readable instructions for converting at least one media file into a format from which the personal media player can then render output.

23. The computer storage medium of claim 15 further comprising computer readable instructions for enabling the personal media player to control at least one process from a group of processes comprising identification, selection, and downloading as stated in the claim.

24. The computer storage medium of claim 15 further comprising computer readable instructions for enabling the personal media player to control the processes of identification, selection, and downloading as stated in the claim.

25. The computer storage medium of claim 15 further comprising computer readable instructions for enabling the computer system to control the processes of identification, selection, and downloading as stated in the claim.

* * * * *

UNITED STATES PATENT AND TRADEMARK OFFICE
CERTIFICATE OF CORRECTION

| | | |
|---|---|---|
| PATENT NO. | : 7,426,329 B2 | Page 1 of 1 |
| APPLICATION NO. | : 10/384923 | |
| DATED | : September 16, 2008 | |
| INVENTOR(S) | : John C. Calhoon et al. | |

It is certified that error appears in the above-identified patent and that said Letters Patent is hereby corrected as shown below:

In column 9, line 58, in Claim 1, delete "systems," and insert -- system, --, therefor.

Signed and Sealed this
Twenty-sixth Day of April, 2011

David J. Kappos
*Director of the United States Patent and Trademark Office*